3,453,220
POLY (METHYLENENAPHTHYLENE) RESIN AND METHOD OF MAKING SAME
William D. Vanderwerff, West Chester, Pa., assignor to Sun Oil Company, Philadelphia, Pa., a corporation of New Jersey
No Drawing. Filed Aug. 14, 1967, Ser. No. 660,222
Int. Cl. C08g 7/00, 53/02
U.S. Cl. 260—2.2          6 Claims

ABSTRACT OF THE DISCLOSURE

Poly(methylenenaphthylene) resin can be prepared as a white, free-flowing powder by carrying out the condensation reaction slowly at temperatures of less than 60° C. in a solvent in which the reactants are soluble but the resin is not. This free-flowing powder is infusible below 350° C. It can be easily sulfonated to prepare a useful cation-exchange resin.

BACKGROUND OF THE INVENTION

This invention relates to poly(methylenenaphthylene) resins.

The so called dinaphthylmethane resins, formed by reacting formaldehyde or a polymer thereof with naphthalene or alkyl-substituted naphthalenes, have found importance as plasticizers for polyvinyl chloride and ingredients in printing inks and paints.

One of the earliest investigators to produce synthetic resins from petroleum fractions was Nastyukoff. Since that time there has been a continuing flow of development on the processes, the reactants and the nature of the product. For example the catalyst used by Nastyukoff was concentrated sulfuric acid. The catalyst systems now known include $H_2SO_4$ modified with methanol, water, acetic acid; $AlCl_3$; HF; $BF_3$ modified with formic acid, acetic acid, water or methanol; $ZnCl_2$— acetic acid, formic acid; ferric chloride; dilute phosphoric acid; sulfonated polystyrene resin and acidic clays.

The polymers produced by these various catalysts have varied from viscous liquids through hard, brittle solids. It is the solid polymer with which this invention is concerned. Without exception the solid reaction products have been either low-melting gums or higher-melting brittle solids. In order to handle the products on a large scale it would be necessary to subject them to further processing in order to particulate them, mold them into pellets or dissolve them in suitable solvents.

The present invention seeks to avoid these difficulties by providing a process wherein the poly(methylenenaphthylene) resin is free-flowing powder. The free-flowing poly(methylenenaphthylene) resin of the invention can be employed in any of the utilities of the less easily handled resins of the prior art for example as paint resins, printing ink ingredient, hot melt adhesive ingredients, as plasticizers, in floor tile, fluxing agents and the like. In addition to these well known uses it has been found that the free-flowing form can be easily sulfonated and produces a regenerable ion-exchange material. Ion-exchange materials are used in chemical syntheses, food processing and water conditioning such as softening and deionization. The instant sulfonated poly-(methylenenaphthylene) resins are quite well suited for water conditioning.

SUMMARY OF THE INVENTION

The present invention relates to free-flowing poly-(methylenenaphthylene) resin which is infusible below 350° C., the novel process for the production thereof and a sulfonated ion-exchange resin prepared therefrom.

DESCRIPTION OF THE INVENTION

The white, free-flowing poly(methylenenaphthylene) resin of the invention is prepared by reacting naphthalene and formaldehyde as described below. By the term naphthalene is meant, in addition to naphthalene per se, suitable alkylnaphthalenes. Generally, suitable alkylnaphthalenes would be those containing 1–4 alkyl groups having 1–12 carbon atoms in each alkyl group.

In addition to these requirements it is desirable that unsymmetrically substituted alkylnaphthalenes have the two alpha positions in the most activated ring unsubstituted. The reason for this is obvious to those familiar with naphthalene chemistry, but it will be set forth again briefly.

The naphthalene nucleus is activated toward electrophilic substitution in the alpha positions by the adjacent ring and at positions ortho and para to alkyl substituents, the effects being additive. The most efficacious substrates for the preparation of poly(methylenenaphthylenes) are therefore naphthalenes which have two unsubstituted alpha positions in the most highly substituted ring in order that polymer formation does not require the molecule to react first at a very reactive position and then at a position of reduced reactivity. In this connection it should be appreciated that the polymerization itself involves the addition of an alkyl substituent.

In the case of the symmetrically substituted alkylnaphthalenes there must be at least two unsubstituted alpha positions in the molecule.

In order to describe the necessary alpha positions in both symmetrically and unsymmetrically substituted alkylnaphthalenes the phrase "functionally available alpha positions" will be used. Thus the suitable alkylnaphthalenes for the present invention are alkylnaphthalenes having at least two functionally available alpha positions and containing 1–4 alkyl groups having 1–12 carbon atoms in each alkyl group. Suitable alkylnaphthalenes would include 2-methylnaphthalene; 2,3-dimethylnaphthalene; 2,5-dimethylnaphthalene; 2,6-dimethylnaphthalene; 2-ethyl-5-methylnaphthalene; 1,5-dimethylnaphthalene; 2,7-dimethylnaphthalene and the like.

By the term formaldehyde is meant formaldehyde per se or a substance which will decompose to yield formaldehyde under process conditions, such as paraformaldehyde and methylal.

The reaction is carried out in a suitable solvent. The solvent is quite important to the reaction. The solvent of course is inert to the reactants or substantially so and it is one in which all of the reactants are soluble, but the poly(methylenenaphthylene) product, is insoluble. Halogenated hydrocarbons generally are suitable since they possess the necessary inertness and solvency. Specifically some of these solvents are carbon tetrachloride, chloroform, methylene chloride, mono-, di- and trichlorobenzenes, mixtures of chlorinated benzenes, perchloroethylene, sym-tetrachloroethane, 1,1,2-trifluoro-1,2,2-trichloroethane, ethylbromide, bromotrichloromethane, 1,1-dibromoethane, 1,1-dichloro 1,2,2,2-tetrafluoroethane, and the like. The reaction was carried out by dissolving the naphthalene and either the formaldehyde or the catalyst in the solvent. After the two components had dissolved, the third reactant, either formaldehyde or catalyst, which was not previously added was added slowly in a dropwise manner over a period of 30 minutes to 2 hours while the reaction mass was stirred vigorously. The addition was made at a temperature of less than room temperature (ambient) down to the point where agitation of the solution becomes difficult, preferably this is in range of −15 to 10° C. During this addition the temperature was maintained at less than ambient, preferably in the range of −15 to 10° C. At the end of the dropwise addition the reaction mass is allowed to rise to a temperature as high as 60° C. but preferably to room temperature. It is maintained at this temperature and stirred for 1 to 24 hours. At the end of the reaction the solid polymer was isolated and purified by conventional means, i.e., filtration and water and alcohol washing. The product was a white, free-flowing powder which softens but will not melt below 350° C.

The catalysts employed are those Lewis or Bronsted acids conventionally used in naphthalene-formaldehyde condensation such as boron trifluoride and its complexes (boron trifluoride etherate), sulfuric acid, formic acid, phosphoric acid, aluminum chloride, ferric chloride and the like.

As stated above one utility of these poly(methylenenaphthylene) resins is the preparation of ion-exchange resins. This is achieved by conventional sulfonation using known sulfonating agents such as concentrated sulfuric acid, fuming sulfuric acid, chlorosulphonic acid and the like. U.S. Patent 2,366,007 to Alelio teaches such a sulfonation to prepare ion-exchange resins from poly(vinyl aryl) compounds.

The procedure employed here is one of the most convenient. Concentrated sulfuric acid is slurried with the poly(methylenenaphthylene) resin at an elevated temperature for example 100–150° C. for 10–120 minutes. The sulfonated product is recovered and washed with water then dried. The product is still a free-flowing powder but is darker in color than the unsulfonated resin.

Since the sulfonic acid group is the active portion of the ion-exchange material the resin is a cation-exchange resin. The cation-exchange material of the invention can be used alone or in combination with other cation-exchange materials or with anion-exchange materials. In this regard the resins are useful for water deionization.

The following illustrative examples are presented to aid those skilled in the art in understanding and reproducing the invention.

EXAMPLE I 103 grams (0.805 moles) of naphthalene and 100 ml. (1.125 moles) of methylal were dissolved in 500 ml. of chloroform and the solution chilled to 5° C., then 100 ml. of conc. sulfuric acid was added dropwise to the vigorously stirred and chilled solution over a period of one hour. The reaction mixture was then slowly warmed to ambient temperature and stirred for 20 hours. The resulting semi-solid mass was poured into water, with the aid of some added chloroform and stirred for 30 minutes. The water was decanted, fresh hot water added, and the chloroform evaporated off on the steam bath. The water was decanted from the solids which were then triturated with ethanol and filtered. The filter cake was washed with water and dried to yield 109 grams (96%) of a white, free-flowing powder which softens but does not melt below 350° C.

EXAMPLE II

The product of Example I was extracted with benezene. The remaining solids were white and free-flowing but neither softened nor melted below 350° C.

EXAMPLE III

Essentially the same procedure as Example I was followed but sulfuric acid was mixed with the naphthalene-chloroform solution and the methylal added dropwise. The product was the same.

EXAMPLE IV

Ten grams of the naphthalene-formaldehyde polymer of Example I was slurried in 100 ml. of concentrated sulfuric acid and the stirred slurry heated for 45 minutes at 130° C. this mixture was then poured onto crushed ice, filtered, washed with water and dried to yield 13.1 grams of a grey-black powder.

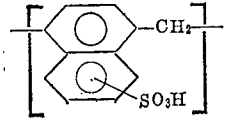

The elemental analysis was Calc'd for: C, 59.98%; H, 3.66%; S, 14.56%. Found: C, 56.94%; H, 4.95%; S, 13.46%. This analysis indicates that 0.925 sulfonic acid groups per repeating unit were incorporated in the polymer.

The theoretical exchange capacity calculated from the above analysis is 4.20 milliequivalents per gram. The actual exchange capacity of this resin was determined experimentally by stirring the resin with an excess of dilute aqueous sodium chloride and then titrating the resultant solution with sodium hydroxide. A value of 3.6 milliequivalents per gram was obtained; this is 86 percent of the theoretical capacity.

The invention claimed is:
1. The method of preparing a poly(methylenenaphthylene) resin comprising
 (a) dissolving a naphthalene compound selected from the group consisting of naphthalene and alkylnaphthalenes wherein said alkylnaphthalenes contain 1 to 4 alkyl groups having from 1 to 12 carbon atoms in each alkyl group in a halogenated hydrocarbon solvent maintained at a temperature below ambient,
 (b) adding to said solvent a second component selected from the group consisting of formaldehyde and a condensation catalyst,
 (c) adding by incremental addition to the mixture of naphthalene and the second component in said solvent a third component selected from the group consisting of formaldehyde and a condensation catalyst provided the third component is different than the second component,
 (d) allowing the temperature to rise to a temperature of up to 60° C. and
 (e) recovering the polymer product provided the reaction components are soluble in said solvent and the polymer is insoluble.
2. The method according to claim 1 wherein the temperature in step (a) is in the range of −15 to 10° C. and is allowed to rise in step (d), to ambient temperature.
3. The method according to claim 1 wherein the solvent is chloroform.
4. The method according to claim 1 wherein the naphthalene compound is an alkylnaphthalene having at least two functionally available alpha positions and containing 1 to 4 alkyl groups, having 1 to 12 carbon atoms in each alkyl group.
5. A free-flowing powder, non-melting below 350° C. produced by the process of claim 1.
6. A free-flowing powder as described in claim 5 wherein the poly(methylenenaphthylene) resin is sulfonated.

References Cited

UNITED STATES PATENTS 2,958,676  11/1960  Krzikalla et al. _____ 260—67

FOREIGN PATENTS 1,069,623  2/1954  France.
942,057  11/1963  Great Britain.
149,569  1962  U.S.S.R.

WILLIAM H. SHORT, Primary Examiner.

M. GOLDSTEIN, Assistant Examiner.

U.S. Cl. X.R.

260—2, 67